(12) United States Patent
Sone et al.

(10) Patent No.: US 7,584,532 B2
(45) Date of Patent: Sep. 8, 2009

(54) APPARATUS FOR PROCESSING A MAGNETIC HEAD SLIDER

(75) Inventors: Shunsuke Sone, Kawasaki (JP); Hirokazu Yamanishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 300 days.

(21) Appl. No.: 11/367,367

(22) Filed: Mar. 6, 2006

(65) Prior Publication Data

US 2007/0135018 A1 Jun. 14, 2007

(30) Foreign Application Priority Data

Dec. 13, 2005 (JP) .............................. 2005-359009

(51) Int. Cl.
*G11B 5/127* (2006.01)
*H04R 31/00* (2006.01)

(52) U.S. Cl. .............. 29/603.03; 29/603.04; 29/603.12; 451/5; 451/8; 451/10; 451/36; 451/37

(58) Field of Classification Search .............. 29/603.12, 29/603.15, 603.16, 603.18, 737; 451/5, 8, 451/10, 36, 37, 41
See application file for complete search history.

(56) References Cited

U.S. PATENT DOCUMENTS 5,885,131 A * 3/1999 Azarian et al. ................. 451/5

6,872,123 B2 3/2005 Sudo et al.
7,275,311 B2 * 10/2007 Markevitch et al. ........... 29/737

FOREIGN PATENT DOCUMENTS

| JP | 1-92922 | 4/1989 |
| JP | 2-161607 | 6/1990 |
| JP | 2004-249375 | 9/2004 |

* cited by examiner

*Primary Examiner*—Paul D Kim
(74) *Attorney, Agent, or Firm*—Fujitsu Patent Center

(57) ABSTRACT

An apparatus for processing a magnetic head slider used for a magnetic disk apparatus for performing a magnetic recording/reproducing process in a discoid recording medium. The apparatus for processing a magnetic head slider includes a discoid recording medium used as an abrasive material, a holding unit configured to hold a suspension arm on which a magnetic head slider is disposed, an elevating unit configured to bring the magnetic head slider into contact with the discoid recording medium in a sliding manner by elevating and lowering the discoid recording medium, and a rotating unit configured to rotate the discoid recording medium at a rotation speed lower than a rotation speed upon the magnetic recording/reproducing process.

4 Claims, 5 Drawing Sheets

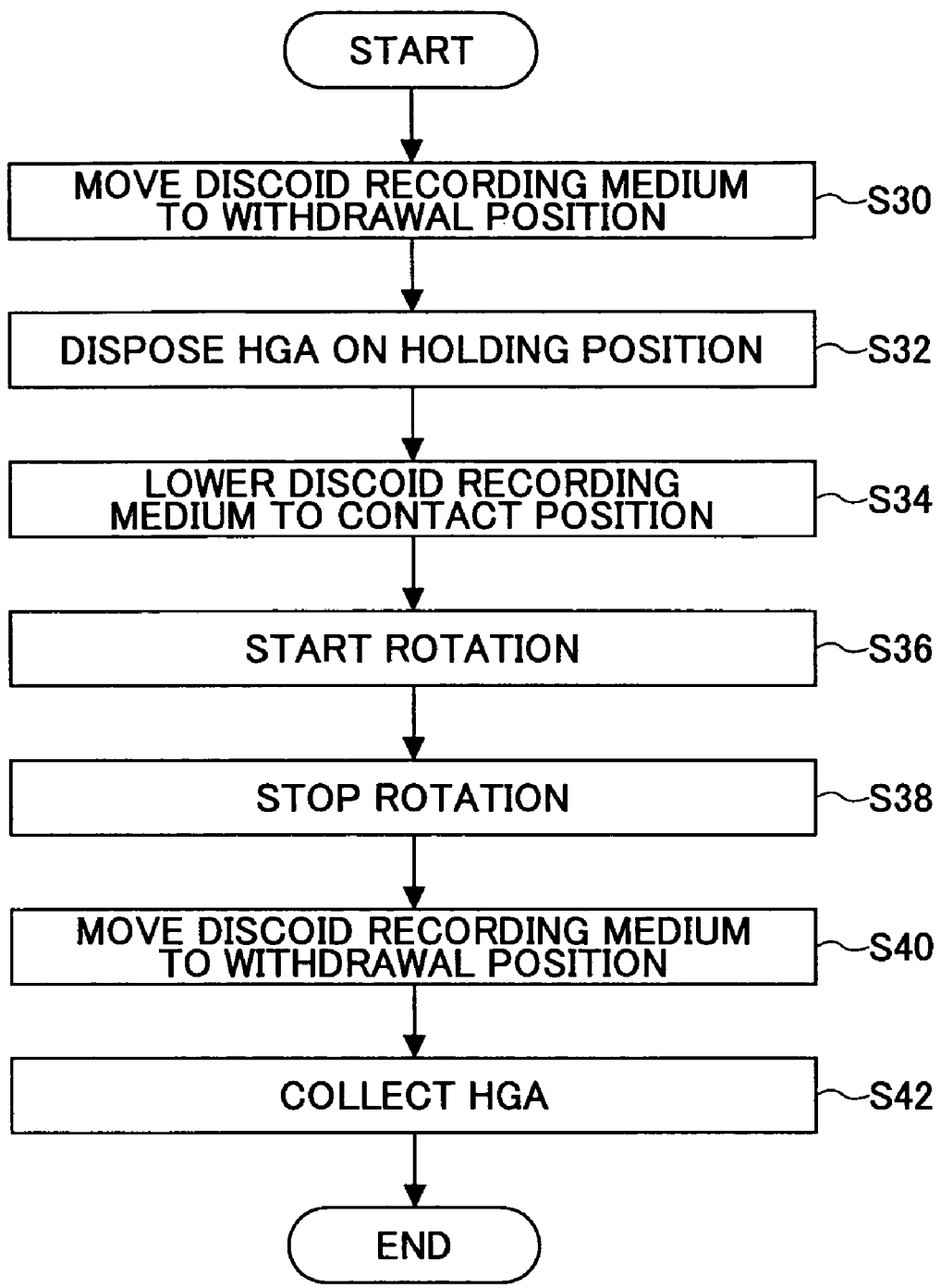

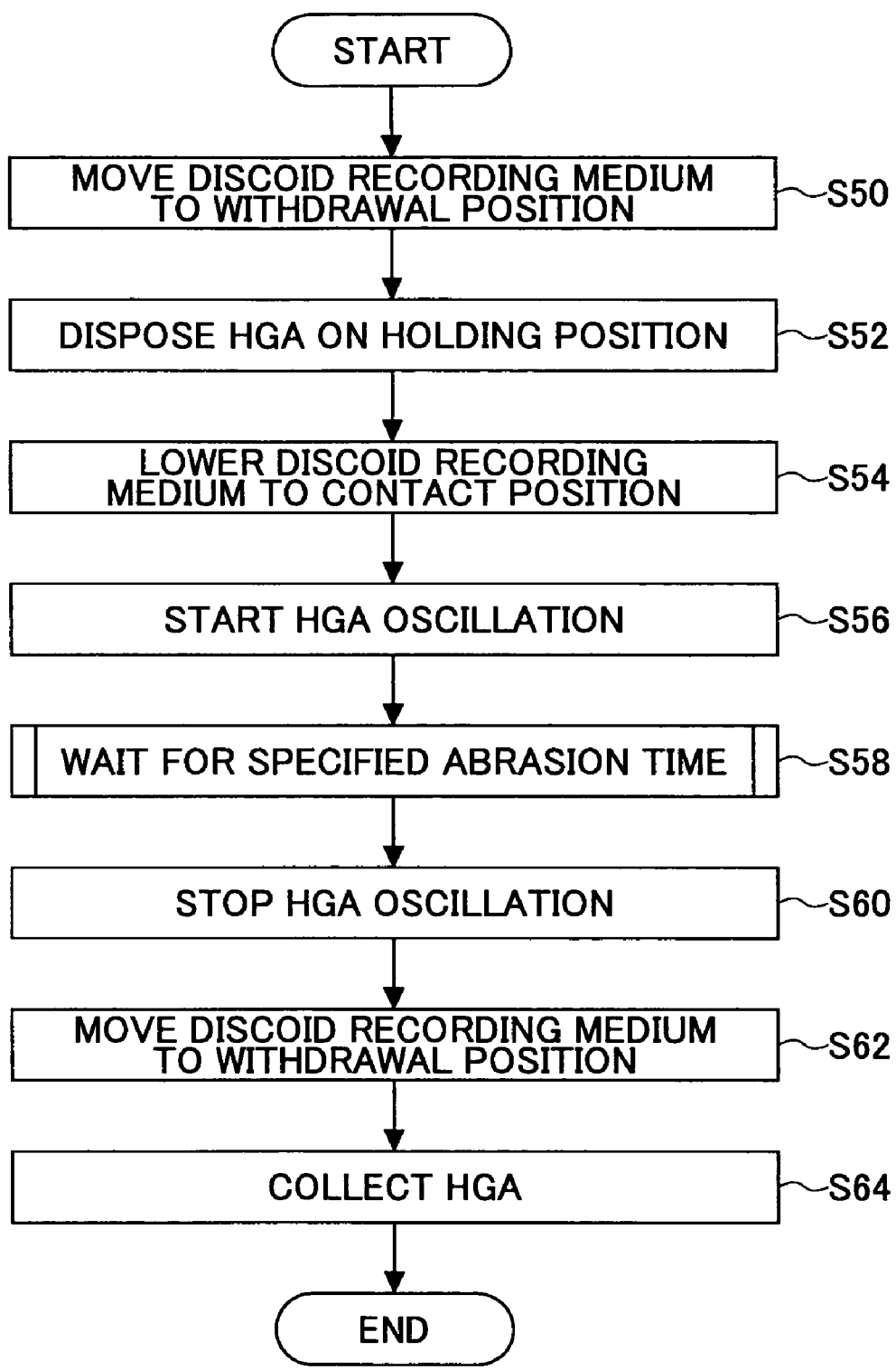

APPARATUS FOR PROCESSING A MAGNETIC HEAD SLIDER

BACKGROUND OF THE INVENTION

1. Field of the Invention

The present invention relates to an apparatus and a method for processing a magnetic head slider, and more particularly to an apparatus and a method for processing a magnetic head slider in which minute protrusions adhered to an air bearing surface of the magnetic head slider are removed by abrasion.

2. Description of the Related Art

Magnetic disk apparatuses perform recording/reproducing of information while holding a magnetic head slider on a surface of a recording medium with a certain amount of flotation. The magnetic head slider has a structure such that it is attached to an end of a suspension arm having spring characteristics (the structure is referred to as HGA: Head Gimbal Assembly). A surface of the magnetic head slider facing the recording medium is referred to as an air bearing surface, in which concavity and convexity are formed to cause the magnetic head slider to float by receiving an air flow through the rotation of the recording medium (refer to Patent Document 1, for example).

In a step for assembling a magnetic disk apparatus, a plurality of HGAS are stacked (HSA: Head Stack Assembly) and then inserted into a space with the recording medium. In this case, if protrusions such as burrs exist at an end portion of the magnetic head slider, failure such as damage to the recording medium is caused. Thus, a step for processing the magnetic head slider has an additional step for removing the burrs and the like at the end portion by abrasion using a lapping tape, for example.

Specifically, Patent Document 2 discloses a method for performing abrasion by applying vibration to the suspension arm in a state where an abrasive member and the magnetic head slider are brought into contact with each other. Further, Patent Document 3 discloses a method for performing abrasion using an oscillation movement in a state where the magnetic head slider is brought into contact with a rapidly rotating disk in which a carbon film is formed.

Patent Document 1: Japanese Laid-Open Patent Application No. 2004-249375

Patent Document 2: Japanese Laid-Open Patent Application No. 01-092922

Patent Document 3: Japanese Laid-Open Patent Application No. 02-161607

However, the method for removing protrusions as disclosed in Patent Document 2 mentioned above is problematic in that the direct application of vibration to the suspension arm may cause damage to the HGA. Also, the method for removing protrusions as disclosed in Patent Document 3 is problematic in that it may cause damage to the HGA, since the load resulting from the contact with the rotator and the load resulting from the oscillation are applied at one time.

Further, although any methods for removing protrusions disclosed in Patent Documents are effective in order to remove relatively large burrs, they pose a problem in that it is difficult to remove only those minute protrusions in the crystal level, which are dealt with in the present invention.

In particular, with the advance of the development of high-performance and small-size magnetic disk apparatuses in recent years, if minute protrusions exist in the magnetic head slider, the minute protrusions may collide with a magnetic disk and become a factor for inhibiting a good magnetic recording/reproducing process.

SUMMARY OF THE INVENTION

It is a general object of the present invention to provide an improved and useful apparatus and method for processing a magnetic head slider in which the above-mentioned problems are eliminated.

A more specific object of the present invention is to provide an apparatus and a method for processing a magnetic head slider which is readily and certainly capable of removing minute protrusions in the crystal level.

In order to achieve the above-mentioned objects, the present invention includes the following measures.

The present invention provides, according to one aspect, an apparatus for processing a magnetic head slider used for a magnetic disk apparatus for performing a magnetic recording/reproducing process in a discoid recording medium. The apparatus for processing a magnetic head slider comprises: a discoid recording medium used as an abrasive material; a holding unit configured to hold a suspension arm on which a magnetic head slider is disposed; an elevating unit configured to bring the magnetic head slider into contact with the discoid recording medium in a sliding manner by elevating and lowering the suspension arm; and a rotating unit configured to rotate the discoid recording medium at a rotation speed lower than a rotation speed upon the magnetic recording/reproducing process.

According to the aforementioned invention, the minute protrusions of the magnetic head slider are removed by bringing the magnetic head slider into contact with the discoid recording medium in a sliding manner through the ascent and descent using the elevating unit, the magnetic head slider being supported on the suspension arm by the supporting unit, and the discoid recording medium being rotated at the rotation speed lower than the rotation speed upon the magnetic recording/reproducing process. This enables the removal of only those minute protrusions without causing damage to the magnetic head slider.

The present invention provides, according to another aspect, the apparatus for processing a magnetic head slider, including a detecting unit configured to detect a contact state between the discoid recording medium and the magnetic head slider in a non-contact manner.

According to the aforementioned invention, it is possible to recognize the contact state between the discoid recording medium and the magnetic head slider using the detecting unit. Thus, it is possible to set the rotation speed of the discoid recording medium such that an optimum lift for removing the minute protrusions can be generated and to perform the removal of the minute protrusions in an optimum state.

The present invention provides, according to another aspect, a method for processing a magnetic head slider used for a magnetic disk apparatus for performing a magnetic recording/reproducing process in a discoid recording medium. The method for processing a magnetic head slider comprises the steps of: positioning a magnetic head slider disposed on a suspension arm such that it faces a discoid recording medium used as an abrasive material; and removing minute protrusions of the magnetic head slider by rotating the discoid recording medium at a rotation speed lower than a rotation speed upon the magnetic recording/reproducing process and by bringing the magnetic head slider into contact with the discoid recording medium.

According to the aforementioned invention, the minute protrusions of the magnetic head slider are removed by bringing the magnetic head slider into contact with the discoid recording medium in a sliding manner, the magnetic head slider being supported on the suspension arm, and the discoid recording medium being rotated at the rotation speed lower than the rotation speed upon the magnetic recording/reproducing process. Thus, it is possible to remove the minute protrusions from the magnetic head slider in a simple and efficient manner.

The present invention provides, according to another aspect, the method for processing a magnetic head slider, in which the rotation of the discoid recording medium is started in a state where the magnetic head slider is brought into contact with the discoid recording medium.

According to the aforementioned invention, the rotation of the discoid recording medium is started in the state where the magnetic head slider is brought into contact with the discoid recording medium. The minute protrusions generated on the magnetic head slider are removed upon the start of the rotation, since the minute protrusions generated on the magnetic head slider are brought into contact with the discoid recording medium before the start of the rotation. Thus, it is possible to remove the minute protrusions in a short time and in an efficient manner.

The present invention provides, according to another aspect, a method for processing a magnetic head slider used for a magnetic disk apparatus for performing a magnetic recording/reproducing process in a discoid recording medium. The method for processing a magnetic head slider comprises the steps of: positioning a magnetic head slider disposed on a suspension arm such that it faces a discoid recording medium used as an abrasive material; and removing minute protrusions of the magnetic head slider by causing the magnetic head slider to perform a reciprocating movement on the discoid recording medium in a radius direction of the discoid recording medium.

According to the aforementioned invention, by causing the magnetic head slider to perform the reciprocating movement in the radius direction of the discoid recording medium, it is possible to bring the magnetic head slider into contact with the entire surface of the discoid recording medium in a sliding manner and to effectively use the discoid recording medium as an abrasive material.

According to the present invention, the abrasive process is performed by bringing the magnetic head slider supported on the suspension arm into contact with the discoid recording medium in a sliding manner, the discoid recording medium being used as an abrasive material and rotated at low speed. Thus, minute protrusions in the crystal level can be readily and certainly removed.

BRIEF DESCRIPTION OF THE DRAWINGS

FIG. 5 is a flowchart of a procedure for processing a magnetic head slider to which a method for processing a magnetic head slider according to a second embodiment of the present invention is applied; and FIG. 6 is a flowchart of a procedure for processing a magnetic head slider to which a method for processing a magnetic head slider according to a third embodiment of the present invention is applied.

DESCRIPTION OF THE PREFERRED EMBODIMENTS

In the following, embodiments of the present invention will be described with reference to the accompanying drawings.

Figure 1:
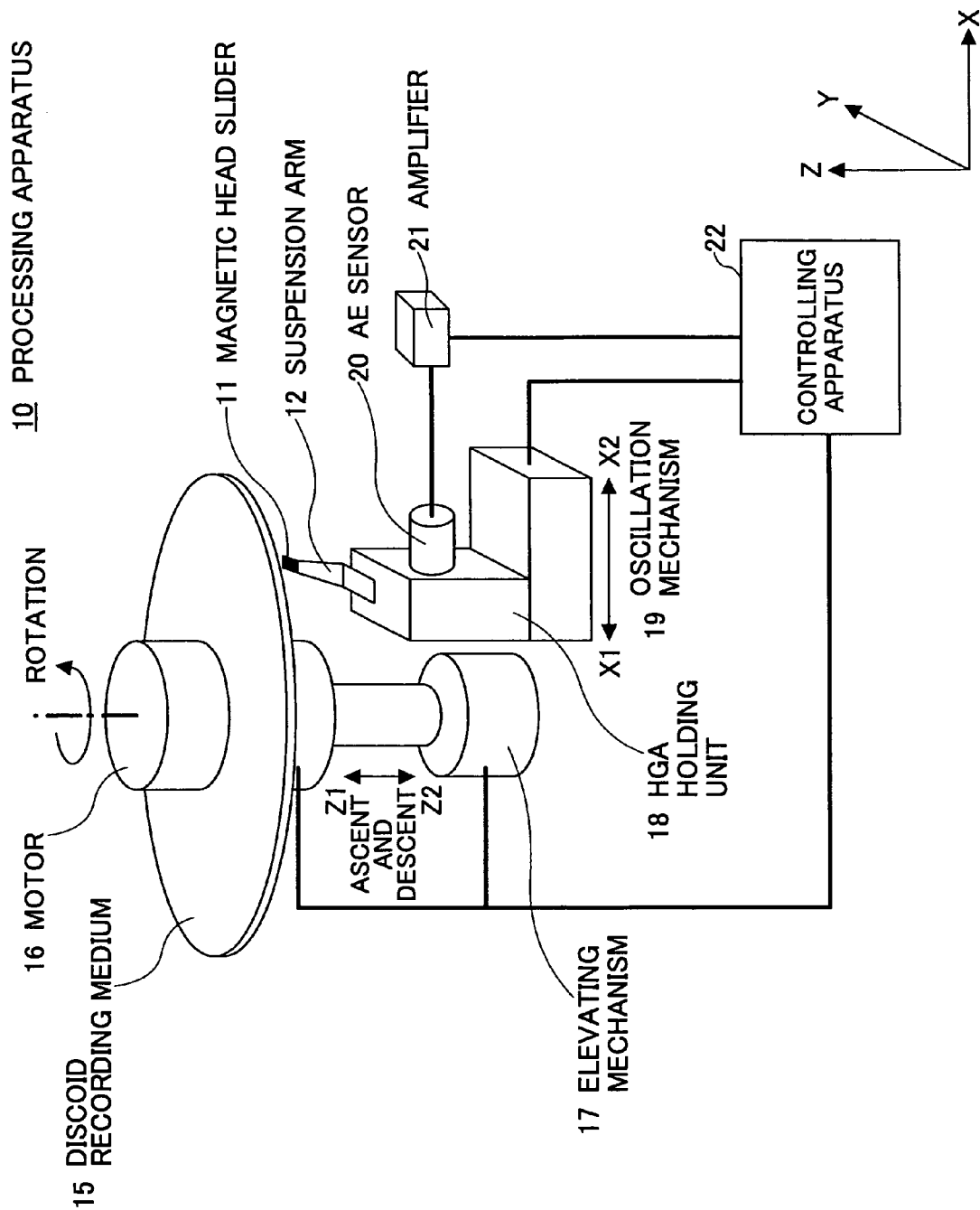
FIG. 1 is a configuration diagram showing an apparatus for processing a magnetic head slider according to one embodiment of the present invention.
Figure 2:
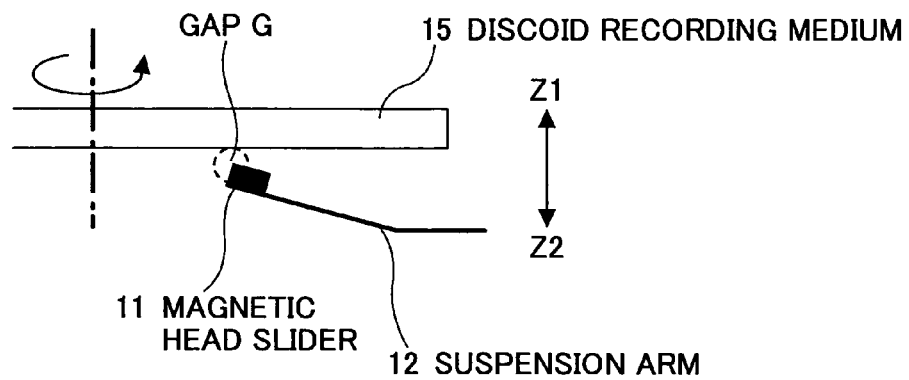
FIG. 2 is an enlarged side view showing a discoid recording medium and a magnetic head slider in an opposing manner.
Figure 3:
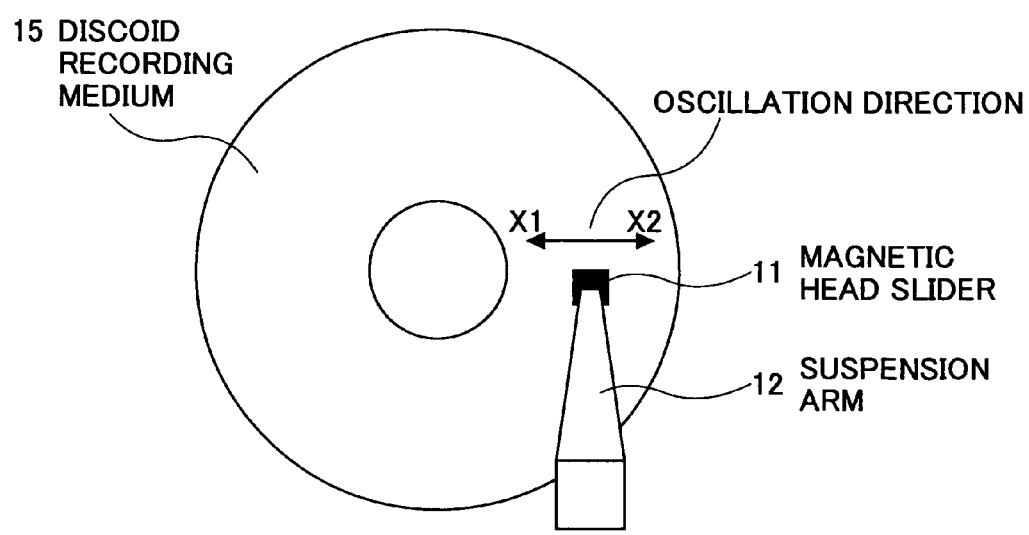
FIG. 3 is an enlarged plan view showing a discoid recording medium and a magnetic head slider in an opposing manner.

FIGS. 1 to 3 are drawings for illustrating a processing apparatus 10 according to one embodiment of the present invention. FIG. 1 is a configuration diagram of the processing apparatus 10 according to one embodiment of the present invention. FIG. 2 is a side view showing a magnetic head slider 11 and a discoid recording medium 15 in an opposing manner. And FIG. 3 is a plan view showing the magnetic head slider 11 and the discoid recording medium 15 in an opposing manner.

As shown in FIG. 1, the processing apparatus 10 substantially comprises the discoid recording medium 15, a motor 16, an elevating mechanism 17, an HGA holding unit 18, an oscillation mechanism 19, an AE sensor 20, a controlling apparatus 22, and the like.

The magnetic head slider 11 to be processed is disposed on a suspension arm 12. The suspension arm 12 is formed using a spring material and configured to be capable of elastic deformation. Also, a gimbal spring (not shown in the drawings) is attached to a tip portion of the suspension arm 12 and the magnetic head slider 11 is attached to the gimbal spring (HGA: Head Gimbal Assembly).

The suspension arm 12 on which the magnetic head slider 11 is disposed is attached to the HGA holding unit 18. The HGA holding unit 18 employs a clamp, vacuum contact, or the like, which is set such that it does not inhibit the spring characteristics of the suspension arm 12 or impede detection described below using the AE sensor 20.

The discoid recording medium 15 is disposed such that it faces the magnetic head slider 11 attached to the HGA holding unit 18 as mentioned above. The discoid recording medium 15 is configured to have the same structure as those generally installed as a magnetic disk in a magnetic disk apparatus (hard disk drive).

In the present embodiment, the discoid recording medium 15 capable of magnetic recording/reproducing processing is used as an abrasive material for removing minute protrusions generated on the magnetic head slider 11 as will be described below. In addition, theoretically, any member (disk) can be used besides the discoid recording medium 15 (magnetic disk) used in the magnetic disk apparatus as long as it has the same smoothness as that of the discoid recording medium 15. However, in the present embodiment, the discoid recording medium 15 is used as an abrasive material because of the ease of availability and the possibility that a disk other than the discoid recording medium 15 may have an influence on the flotation characteristics of the magnetic head slider 11.

The discoid recording medium 15 is configured to be rotated by the motor 16. The motor 16 is connected to the controlling apparatus 22 and configured such that the rotation start time, rotation end time, and rotation speed thereof are controlled by the controlling apparatus controlling apparatus 22.

The discoid recording medium 15 and the motor 16 are configured to be elevated and lowered (movement in the directions shown by arrows Z1 and Z2 in the figure) by the elevating mechanism 17. The aforementioned HGA holding unit 18 does not perform an elevating or lowering movement, so that the height (clearance) of the discoid recording medium 15 relative to the magnetic head slider 11 can be controlled by elevating and lowering the discoid recording medium 15 using the elevating mechanism 17.

Specifically, the discoid recording medium 15 is moved by the elevating mechanism 17 in the space between a contact position for coming into contact with the magnetic head slider 11 and a withdrawal position for spacing from the magnetic where slider 11 (minute protrusions are not removed). The contact position is defined as a position where a gap G (shown in FIG. 2) between the discoid recording medium 15 and the magnetic head slider 11 is the same as or somewhat smaller than when the discoid recording medium 15 is installed in the magnetic disk apparatus. The withdrawal position is defined as a position such that the magnetic head slider 11 is not floated by the rotation of the discoid recording medium 15 (a position where lift due to an air flow is not applied).

The elevating mechanism 17 is connected to the controlling apparatus 22 and configured such that the height position of the discoid recording medium 15 relative to the magnetic head slider 11 is controlled by the controlling apparatus 22.

The HGA holding unit 18 is disposed on the oscillation mechanism 19. The oscillation mechanism 19 is configured to cause the HGA holding unit 18 to move in a radius direction of the discoid recording medium 15 (in the directions shown by arrows X1 and X2 in the figure, hereafter referred to as an oscillation direction). Thus, by moving the HGA holding unit 18 through an operation of the oscillation mechanism 19, the magnetic head slider 11 is also moved via the suspension arm 12.

The movement direction of the magnetic head slider 11 includes the radius direction of the discoid recording medium 15 (in the directions shown by arrows X1 and X2, refer to FIG. 3). Also, the oscillation mechanism 19 is connected to the controlling apparatus 22. Thus, the oscillation mechanism 19 is configured such that the position of the magnetic head slider 11 in the oscillation direction is controlled by the controlling apparatus 22.

The AE (Acoustic Emission) sensor 20 includes a sensor for detecting a contact state between the magnetic head slider 11 and the discoid recording medium 15. Acoustic emission refers to a phenomenon of emitting a sound as an elastic wave generated when a solid body is deformed or destroyed. By detecting the elastic wave using the AE sensor, it is possible to evaluate the deformation or the destruction of the solid body in a nondestructive manner.

In the present embodiment, the AE sensor 20 detects the elastic wave generated when the magnetic head slider 11 collides with the discoid recording medium 15. Whether or not the magnetic head slider 11 is brought into contact with the discoid recording medium 15 is detected in accordance with the result. The AE sensor 20 is connected to the controlling apparatus 22 via an amplifier 21. The controlling apparatus 22 detects the contact state between the magnetic head slider 11 and the discoid recording medium 15 on the basis of a signal from the AE sensor 20.

Although the AE sensor 20 is used in the present embodiment, other sensor may be used as long as it is capable of detecting the aforementioned contact state without coming to contact with the HGA.

The following describes a process for removing minute protrusions generated on the magnetic head slider 11 using the processing apparatus 10 having the aforementioned configuration. First, prior to specific embodiments, an operation principle used as the basis of the present invention is described.

As mentioned above, the magnetic head slider 11 having the HGA structure is floated relative to the discoid recording medium 15 by receiving an air flow in the air bearing surface thereof through the rotation of the discoid recording medium 15. The rotation speed (number of revolution) of the discoid recording medium 15 is determined by the specification of the magnetic disk apparatus as a product. The magnetic head slider 11 and the HGA are designed to obtain a prescribed amount of flotation (loading state) with an air flow due to the rotation speed prescribed in the specification.

In this case, by making the rotation speed not more than the prescribed speed, the amount of flotation can be decreased. In other words, by controlling the rotation speed, it is possible to control the amount of flotation (gap G) of the magnetic head slider 11 relative to the discoid recording medium 15. Thus, through the control of the rotation speed of the discoid recording medium 15, the magnetic head slider 11 can be brought into contact with the discoid recording medium 15 under slight pressure, thereby removing minute protrusions generated on the magnetic head slider 11 using the discoid recording medium 15.

Figure 4:
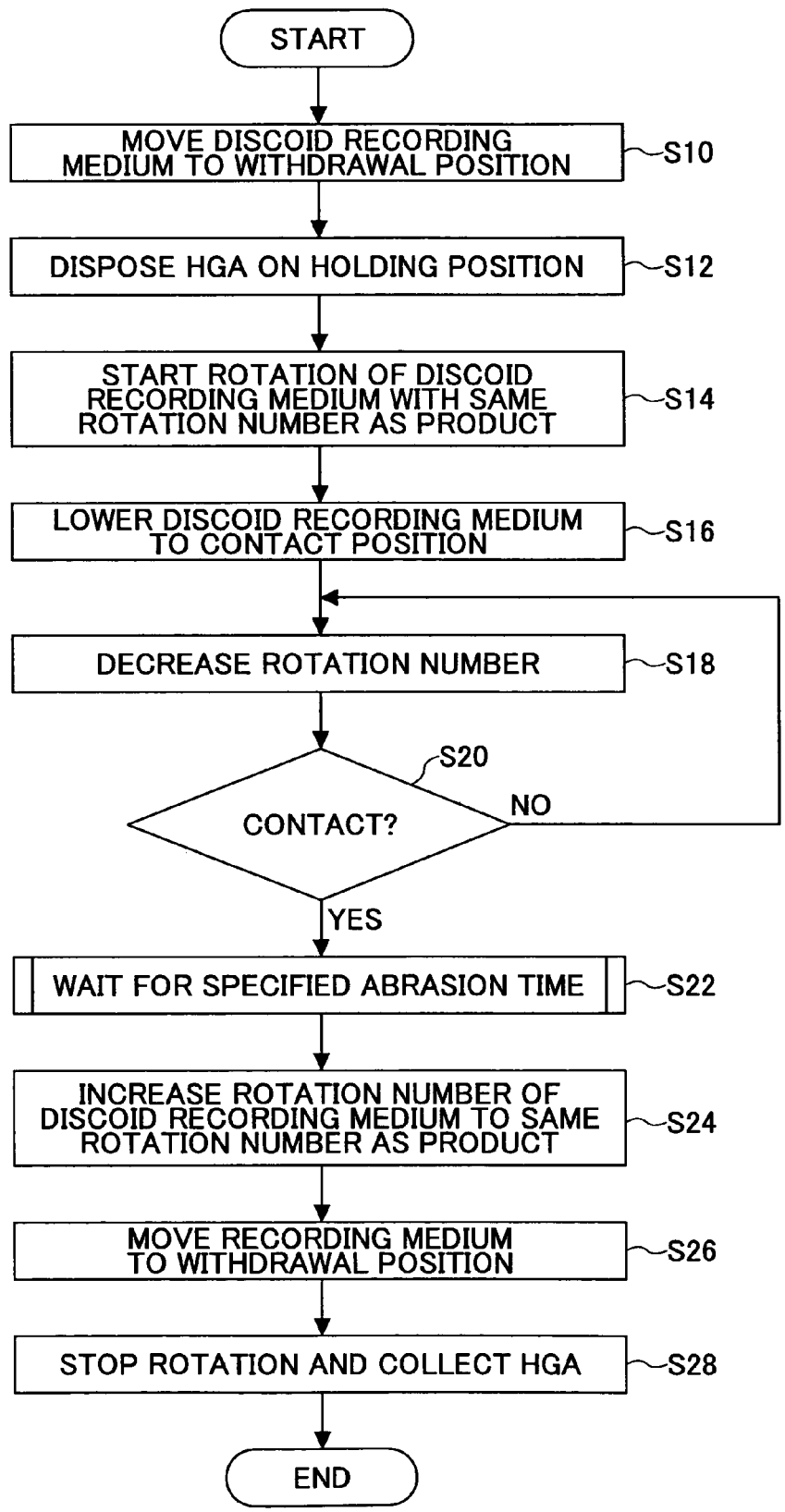
FIG. 4 is a flowchart of a procedure for processing a magnetic head slider to which a method for processing a magnetic head slider according to a first embodiment of the present invention is applied.

The following describes specific processing methods for removing minute protrusions using the processing apparatus 10. FIG. 4 is a flowchart showing a first embodiment of processing for removing minute protrusions performed by the controlling apparatus 22.

When the processing as shown in the figure is activated, first, in step 10 (step is abbreviated as S in the drawings), the controlling apparatus 22 moves the discoid recording medium 15 to the withdrawal position by performing the drive control of the elevating mechanism 17, the withdrawal position greatly spacing from the magnetic head slider 11. Next, in step 12, the suspension arm 12 on which the magnetic head slider 11 is disposed in advance is held by the HGA holding unit 18. Accordingly, the magnetic head slider 11 is mounted on the processing apparatus 10.

In step 14, the controlling apparatus 22 starts the rotation of the discoid recording medium 15 by performing the drive control of the motor 16 and increases the rotation speed such that it corresponds to the rotation speed of the magnetic disk apparatus upon performing the magnetic recording/reproducing process (in the following, the rotation speed is referred to as a rotation speed upon product installation). Then, when the discoid recording medium 15 is rotated at the rotation speed upon product installation, in step 16, the controlling apparatus 22 lowers the discoid recording medium 15 (movement in the Z2 direction) to the aforementioned contact position by performing the drive control of the elevating mechanism 17.

In this state, the discoid recording medium 15 is rotated at the rotation speed upon product installation due to the process in step 14. Thus, the magnetic head slider 11 is floated relative to the discoid recording medium 15 and the magnetic head slider 11 does not touch the discoid recording medium 15.

In step 18, the controlling apparatus 22 decreases the rotation speed of the discoid recording medium 15 by performing the drive control of the motor 16. In step 20, the controlling apparatus 22 detects whether or not the magnetic head slider 11 is brought into contact with the discoid recording medium 15 in accordance with a signal from the AE sensor 20. By decreasing the rotation speed of the discoid recording medium 15, a lift relative to the magnetic head slider 11 becomes smaller, so that the gap G between the magnetic head slider 11 and the discoid recording medium 15 gradually becomes smaller.

The process for decreasing the rotation speed of the discoid recording medium 15 is performed until the magnetic head slider 11 is brought into contact with the discoid recording medium 15. Then, at a certain rotation speed, the lift due to an air flow is less than the restoring force of the suspension arm 12, and the magnetic head slider 11 starts coming into contact with the discoid recording medium 15.

In step 20, when the magnetic head slider 11 is determined to be brought into contact with the discoid recording medium 15, the process proceeds to step 22 and the controlling apparatus 22 maintains the rotation speed of the discoid recording medium 15 for a specified abrasion time determined in advance. Minute protrusions generated on the discoid recording medium 15 are removed within the specified abrasion time.

In the specified abrasion time, the discoid recording medium 15 is rotated at the rotation speed upon the contact with the magnetic head slider 11. Although the lift is smaller as compared with lift obtained at the rotation speed upon product installation, the discoid recording medium 15 maintains the lift generated due to an air flow. Thus, the contact pressure between the magnetic head slider 11 and the discoid recording medium 15 is slight and abrasion is realized under such a slight contact pressure. This enables the removal of the minute protrusions generated on the magnetic head slider 11 in a certain manner and the prevention of damage to the body portion of the magnetic head slider 11 and the suspension arm 12.

When the specified abrasion time has elapsed, the process proceeds to step 24 and the controlling apparatus 22 increases the rotation speed of the discoid recording medium 15 again to the rotation speed upon product installation by performing the drive control of the motor 16. In step 26, the controlling apparatus 22 elevates the discoid recording medium 15 to the withdrawal position (movement in the Z1 direction) by performing the drive control of the elevating mechanism 17.

In step 28, the controlling apparatus 22 stops the rotation of the motor 16 and then detaches the magnetic head slider 11 (suspension arm 12), in which the minute protrusions are removed, from the HGA holding unit 18, thereby ending the series of processing.

As mentioned above, in the present embodiment, the magnetic head slider 11 is supported by the suspension arm 12 having spring characteristics. In this state, the discoid recording medium 15 is rotated at a rotation speed lower than the rotation speed upon product installation and the discoid recording medium 15 removes minute protrusions while maintaining the rotation speed at which the magnetic head slider 11 is brought into contact with the discoid recording medium 15.

According to this method, it is possible to perform abrasion under a slight contact pressure using only the rotation control of the discoid recording medium 15 and the contact control of the discoid recording medium 15 relative to the magnetic head slider 11, so that minute protrusions can be removed from the magnetic head slider 11 in a simple and efficient manner. Also, in the present embodiment, it is possible to have a rotation speed for generating an optimum lift to remove the minute protrusions as the rotation speed of the discoid recording medium 15, because of the use of the AE sensor 20 capable of detecting contact between the magnetic head slider 11 and the discoid recording medium 15 in a non-contact manner. This enables the removal of the minute protrusions in a certain manner without causing damage to the magnetic head slider 11 or the suspension arm 12.

FIG. 5 is a flowchart showing a second embodiment of the processing for removing minute protrusions performed by the controlling apparatus 22.

When the processing as shown in the figure is activated, first, in step 30, the controlling apparatus 22 moves the discoid recording medium 15 to the withdrawal position by performing the drive control of the elevating mechanism 17, the withdrawal position greatly spacing from the magnetic head slider 11. Next, in step 32, the suspension arm 12 on which the magnetic head slider 11 is disposed in advance is held by the HGA holding unit 18. Accordingly, the magnetic head slider 11 is mounted on the processing apparatus 10.

In step 34, the controlling apparatus 22 lowers the discoid recording medium 15 (movement in the Z2 direction) to a position for coming into contact with the magnetic head slider 11 by performing the drive control of the elevating mechanism 17. The detection of contact between the discoid recording medium 15 and the magnetic head slider 11 may be performed using the AE sensor 20.

In step 34, when the discoid recording medium 15 is brought into contact with the magnetic head slider 11, the motor 16 is stationary, so that the discoid recording medium 15 is not rotated. In step 36, the controlling apparatus 22 starts the motor 16 by performing the drive control of the motor 16. Accordingly, the discoid recording medium 15 starts rotation in the state where the magnetic head slider 11 is brought into contact therewith.

The state where the magnetic head slider 11 is brought into contact with the discoid recording medium 15 involves a state where minute protrusions formed on the magnetic head slider 11 are also brought into contact with the discoid recording medium 15. When the discoid recording medium 15 is rotated in the state where the minute protrusions are brought into contact with the discoid recording medium 15, the minute protrusions are removed immediately after the rotation is started.

When the rotation of the discoid recording medium 15 is started in step 36, the controlling apparatus 22 maintains the rotation for a specified abrasion time determined in advance, and then stops the rotation of the discoid recording medium 15 in step 38. The specified abrasion time in the present embodiment may be short such that the discoid recording medium 15 is capable of removing the minute protrusions (time in which the discoid recording medium 15 is rotated several times). Further, unlike the first embodiment, it is not necessary to increase the rotation speed of the discoid recording medium 15 to the rotation speed upon product installation. This enables the removal of the minute protrusions generated on the magnetic head slider 11 in a very short time and thus it is possible to perform the removal process of the minute protrusions in a very short time and in an extremely efficient manner.

In step 38, the rotation of the discoid recording medium 15 is stopped. In step 40, the controlling apparatus 22 elevates the discoid recording medium 15 (movement in the Z1 direction) to the withdrawal position by performing the drive control of the elevating mechanism 17. In step 42, the controlling apparatus 22 detaches the magnetic head slider 11 (suspension arm 12), in which the minute protrusions are removed as mentioned above, from the HGA holding unit 18, thereby ending the series of processing.

FIG. 6 is a flowchart showing a third embodiment of the processing for removing minute protrusions performed by the controlling apparatus 22.

When the processing as shown in the figure is activated, first, in step 50, the controlling apparatus 22 moves the discoid recording medium 15 to the withdrawal position by performing the drive control of the elevating mechanism 17, the withdrawal position greatly spacing from the magnetic head slider 11. Next, in step 52, the suspension arm 12 on which the magnetic head slider 11 is disposed in advance is held by the HGA holding unit 18. Accordingly, the magnetic head slider 11 is mounted on the processing apparatus 10.

In step 54, the controlling apparatus 22 lowers the discoid recording medium 15 (movement in the Z2 direction) to a position for coming into contact with the magnetic head slider 11 by performing the drive control of the elevating mechanism 17. The detection of contact between the discoid recording medium 15 and the magnetic head slider 11 may be performed using the AE sensor 20.

In step 54, when the discoid recording medium 15 is brought into contact with the magnetic head slider 11, the motor 16 is stationary, so that the discoid recording medium 15 is not rotated. Steps 50 to 54 mentioned above are the same processes as steps 30 to 34 shown in FIG. 5 as the second embodiment.

In step 56, the controlling apparatus 22 starts the oscillation movement of the HGA holding unit 18 by performing the drive control of the oscillation mechanism 19. Accordingly, the magnetic head slider 11 performs a reciprocating movement (oscillation) in a radius direction of the discoid recording medium 15 (in the directions shown by arrows X1 and X2 shown in FIG. 3) via the suspension arm 12.

As mentioned above, the state where the magnetic head slider 11 is brought into contact with the discoid recording medium 15 involves the state where minute protrusions formed on the magnetic head slider 11 are also brought into contact with the discoid recording medium 15. When the magnetic head slider 11 (suspension arm 12) is moved in the radius direction of the discoid recording medium 15 in the state where the minute protrusions are brought into contact with the discoid recording medium 15, the minute protrusions are removed immediately after the movement of the magnetic head slider 11 started.

When the movement (oscillation) of the magnetic head slider 11 is started in step 56, the controlling apparatus 22 maintains the movement for a specified abrasion time determined in advance in step 58, and then stops the driving of the oscillation mechanism 19 in step 60. The specified abrasion time in the present embodiment may also be short such that the discoid recording medium 15 is capable of removing the minute protrusions (time in which the discoid recording medium 15 is moved as much as several millimeters) in the same manner as in the second embodiment. Further, it is not necessary to rotate the discoid recording medium 15. This enables the removal of the minute protrusions generated on the magnetic head slider 11 in a very short time and thus it is possible to perform the removal process of the minute protrusions in a very short time and in an extremely efficient manner.

When the oscillation mechanism 19 is stopped in step 60, the controlling apparatus 22 elevates the discoid recording medium 15 to the withdrawal position (movement in the Z1 direction) by performing the drive control of the elevating mechanism 17 in step 62. In step 64, the controlling apparatus 22 detaches the magnetic head slider 11 (suspension arm 12), in which the minute protrusions are removed as mentioned above, from the HGA holding unit 18, thereby ending the series of processing.

In the processing according to the second embodiment, only the motor 16 is driven while the oscillation mechanism 19 is stationary. In the processing according to the third embodiment, only the oscillation mechanism 19 is driven while the motor 16 is stationary. In both embodiments, by combining the motor 16 and the oscillation mechanism 19, it is possible to bring the magnetic head slider 11 into contact with the entire surface of the discoid recording medium 15 in a sliding manner and thus it is possible to effectively use the discoid recording medium 15 as an abrasive material.

In each embodiment mentioned above, the process for removing the minute protrusions formed on the surface of the magnetic head slider 11 is used as the example. However, according to each embodiment, it is possible to remove dust formed or attached to the surface of the magnetic head slider 11 in addition to the minute protrusions.

The present invention is not limited to the specifically disclosed embodiment, and variations and modifications may be made without departing from the scope of the present invention.

The present application is based on Japanese priority application No. 2005-359009 filed Dec. 13, 2005, the entire contents of which are hereby incorporated herein by reference.

What is claimed is:

1. An apparatus for processing a magnetic head slider used for a magnetic disk apparatus for performing a magnetic recording/reproducing process in a discoid recording medium, the apparatus for processing a magnetic head slider comprising:
    a discoid recording medium used as an abrasive material;
    a holding unit configured to hold a suspension arm on which a magnetic head slider is disposed;
    an elevating unit configured to bring the magnetic head slider into contact with the discoid recording medium in a sliding manner by elevating and lowering the discoid recording medium; and
    a rotating unit configured to rotate the discoid recording medium at a rotation speed lower than a rotation speed of the magnetic recording/reproducing process.

2. The apparatus for processing a magnetic head slider according to claim 1, further comprising:
    a detecting unit configured to detect a contact state between the discoid recording medium and the magnetic head slider in a non-contact manner.

3. The apparatus for processing a magnetic head slider according to claim 2, further comprising:
    a reciprocating movement mechanism configured to cause the magnetic head slider to perform a reciprocating movement on the discoid recording medium in a radius direction of the discoid recording medium.

4. The apparatus for processing a magnetic head slider according to claim 1, further comprising:
    a reciprocating movement mechanism configured to cause the magnetic head slider to perform a reciprocating movement on the discoid recording medium in a radius direction of the discoid recording medium.

* * * * *